March 20, 1956
C. S. KELLEY
2,739,144
UREA ADDUCT SEPARATION PROCESS
Filed Nov. 13, 1950
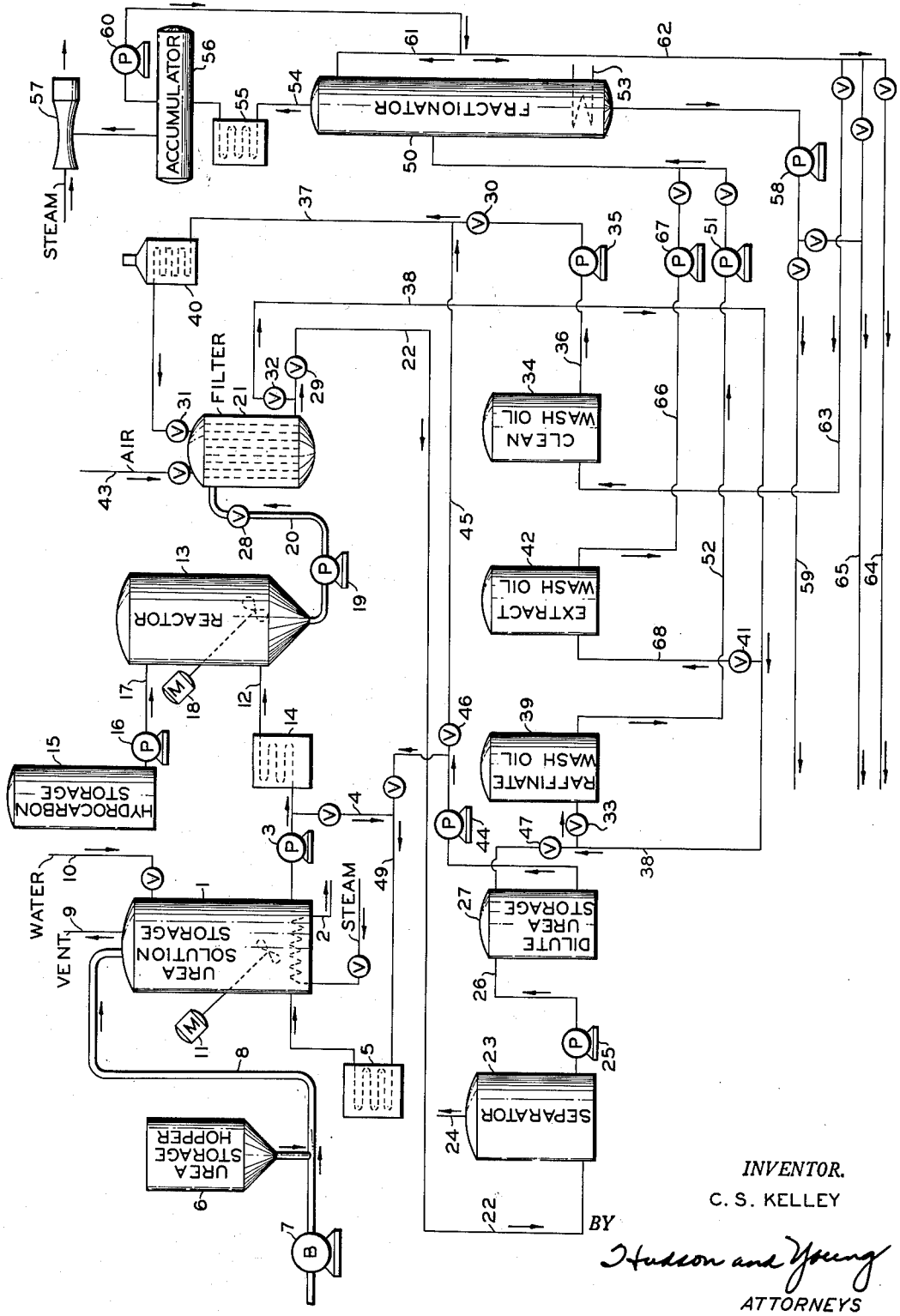
INVENTOR.
C. S. KELLEY
BY Hudson and Young
ATTORNEYS

United States Patent Office 2,739,144
Patented Mar. 20, 1956

2,739,144

UREA ADDUCT SEPARATION PROCESS

Carl S. Kelley, Bartlesville, Okla., assignor to Phillips Petroleum Company, a corporation of Delaware Application November 13, 1950, Serial No. 195,411

4 Claims. (Cl. 260—96.5)

This invention relates to a process for the separation of organic compounds. In one of its aspects, it relates to a process for the separation of a class of compounds characterized by straight carbon atom chains from admixture with another class of organic compounds characterized by branched carbon atom chains by the formation of adducts, either of the former with urea or of the latter with thiourea. In another of its aspects, this invention relates to a process for dissociating the urea and thiourea adducts thus formed.

There are many known processes for the separation of an organic compound from its admixture with other organic compounds. Thus, a compound having a boiling point differing substantially from another compound can be separated therefrom by means of a fractional distillation process. However, compounds having similar boiling points are difficultly separable by such a process. For example, n-octane (B. P. 125.6° C.) cannot be economically separated from 2,2,4-trimethylhexane (B. P. 125.5° C.) because of the small difference in boiling points. Such a separation is often desirable as, for example, in a gasoline manufacturing process in order to improve the octane rating of the gasoline by removal of the low octane straight-chain hydrocarbons therefrom. In another type of separation process, advantage is taken of the degree of unsaturation of the compounds being separated. For example, n-octane can be separated from 3-methyl-2-heptene by polymerization of the 3-methyl-2-heptene to form a higher boiling polymer or by its reaction with another compound, such as sulfuric acid, to form an intermediate which is then easily separable from the n-octane.

There has recently been discovered a process for the separation of organic compounds which process permits the separation of a class of compounds having one type of molecular arrangement from a class of compounds having a different molecular arrangement. Thus, straight-chain hydrocarbons can be separated, individually or as a class, from branched-chain and/or cyclic hydrocarbons independently of the boiling points of the compounds being separated. This process depends upon the peculiar property of urea (CO(NH$_2$)$_2$) which permits it to form adducts with organic compounds having straight carbon atom chains and yet not to form adducts with branched-chain or cyclic organic compounds. Thus, in such a process, it is possible to separate n-octane from 2,2,4-trimethylhexane, isooctane or other branched-chain hydrocarbons, irrespective of their boiling points. Also, straight-chain hydrocarbons can readily be separated from cyclic hydrocarbons, such as benzene, toluene or the cycloparaffins, irrespective of the boiling points of the various components of the mixture thereof.

While urea forms adducts with organic compounds having straight carbon atom chains, thiourea (CS(NH$_2$)$_2$) forms adducts with organic compounds having branched or cyclic carbon atom chains. Thus, the adduct-forming property of thiourea permits a ready separation of such organic compounds from organic compounds having straight carbon atom chains, since the latter do not form adducts with thiourea.

The adducts thus-formed are solid, and, as such, they are readily recoverable from the unreacted compounds in the reaction mixture that form no adducts with urea or thiourea by filtration or other suitable means, and subsequently the adducts are dissociated or decomposed to recover the urea or thiourea and the adduct-forming organic compounds. In most processes, it is necessary to transport solid adduct from the filtration, or other separation, zone to an adduct decomposition zone where the adduct is broken down into either urea or thiourea and adduct-forming compounds. After recovery of the latter compounds, the urea or thiourea is obtained in the solid form, and in most processes it is necessary to recycle the solid urea or thiourea to the adduct-forming reaction zone. Ordinarily, the transportation of solid substances in such a process is both a cumbersome and expensive operation, and the elimination of such steps from a commercial operation is desirable. My invention is intended to achieve this desirable result.

It is an object of this invention to provide a novel process for the separation of organic compounds.

It is another object of this invention to provide a novel process for the separation of organic compounds having a straight chain of carbon atoms from branched-chain and/or cyclic organic compounds by formation of adducts of the former with urea.

It is another object of this invention to provide a novel process for the separation of organic compounds having a branched chain of carbon atoms from straight-chain organic compounds by formation of adducts of the former with thiourea.

It is another object of this invention to provide a novel method for recovering the urea or thiourea after adducts, formed during the separation of the organic compounds, have been decomposed.

It is a further object of this invention to eliminate from such separation processes difficulties encountered in prior art processes.

Further and additional objects of my invention will be readily apparent from the disclosure hereinbelow.

I have found that the adducts of urea or thiourea can be decomposed in the same zone wherein the adducts are separated from the non-adduct forming components of the feed mixture and that the solid urea or thiourea resulting from decomposition of the adducts can then be removed from the same zone in a novel and efficient manner without requiring the movement of any solid material. I will describe my invention in greater detail by referring to the accompanying drawing which represents a preferred method of practicing my invention.

The organic compounds that form adducts with urea are many and varied, and because of such reactivity any straight-chain organic compound capable of forming a solid adduct with urea can be separated from its admixture with any branched-chain or cyclic organic compound that does not form a solid adduct with urea. In determining whether any particular organic compound will or will not form an adduct with urea, it is necessary merely to admix such compound and urea with agitation and then determine whether any crystalline product or adduct has formed. Obviously, such a determination is a matter of mere routine test, and it is well within the skill of the art. However, it has been found that a straight-chain organic compound having a straight aliphatic carbon atom chain containing from six to fifty carbon atoms therein will form adducts with urea in preference to branched-chain or cyclic organic compounds. The straight-chain organic compounds can be unsubstituted hydrocarbons as well as hydrocarbons containing substituent groups, which will be discussed hereinbelow, attached to one of the two end carbon atoms of the carbon chain. Thus, one or more of such straight-chain hydrocarbons as the paraffinic hydrocarbons containing from six to fifty carbon atoms, for example, hexane, heptane, octane, nonane, decane, undecane, dodecane, tridecane, tetradecane, pentadecane, hexadecane, heptadecane, nonadecane, eicosane, heneicosane, docosane and progressively higher molecular weight straight-chain paraffins up to and including pentacontane; and the straight-chain olefins containing from six to fifty carbon atoms, for example, the hexenes, heptenes, octenes, nonenes, decenes, undecenes, dodecenes, tridecenes, tetradecenes, pentadecenes, hexadecenes, heptadecenes, nonadecenes, eicosenes, heneicosenes, docosenes, and progressively higher molecular weight straight-chain olefins up to and including the pentacontenes, form adducts with urea, and accordingly, they can be readily separated from branched-chain or cyclic hydrocarbons that do not form adducts with urea. Additionally, derivatives of these saturated and unsaturated hydrocarbons form adducts with urea. For example, the hydroxy, the amino (primary, secondary and tertiary), the mercaptan, and the halide derivatives of these hydrocarbons form adducts with urea. Also, the various ketone and ester derivatives of these hydrocarbons react similarly. Ordinarily, the various substituent groups set forth above are attached to one of the two end carbon atoms in the unbranched carbon chain of six to fifty carbon atoms. However, when fluorine atoms are attached to the carbon chain, they act similar to hydrogen atoms, and, when attached to any of the carbon atoms in the unbranched chain, they do not inhibit the formation of adducts with urea. The primary characteristic of these organic compounds is the unbranched chain of from six to fifty carbon atoms.

On the other hand, organic compounds containing a branched chain of carbon atoms form adducts with thiourea, and in accordance with this property they are readily separable from organic compounds containing a straight chain of carbon atoms that do not form adducts with thiourea. Thus, with thiourea branched chain hydrocarbons containing from three to fifty carbon atoms in the straight carbon chain portion of the molecule and also having one or more alkyl substituents therein ranging from one to twenty carbon atoms in length, for example, methyl propane, the methyl butanes, dimethyl butane, the methyl pentanes, the ethyl pentanes, trimethyl pentane, diethyl pentane, the methyl hexanes, di-, tri- and tetramethyl hexane, the ethyl hexanes, di-, tri-, and tetraethyl hexane, ethyl heptane and other alkyl paraffins as well as methyl propene, the methyl butenes, di-, tri-, and tetramethyl butenes, the methyl pentenes, the ethyl pentenes, trimethyl pentenes, diethyl pentene and other branched-chain olefins including higher molecular weight olefins, for example, methyl, ethyl, propyl and butyl derivatives of hexadecene, docosene and pentacontene, will form adducts with thiourea. Furthermore, these branched chain compounds may have attached either to the straight chain or the branched chain of carbon atoms any one of the substituent groups set forth above in the discussion of compounds that form adducts with urea. The primary characteristic of these compounds is the branched chain of carbon atoms.

Various alicyclic-type organic compounds form adducts with thiourea. For example, cycloparaffins, such as cyclopentane, cyclohexane, methylcyclopentane, methylcyclohexane, di- and trimethylcyclopentane, and the like, and the corresponding unsaturated hydrocarbons form adducts with thiourea. Also, menthane has been found to form such adducts with thiourea, as well as the oxygenated derivatives of terpenes, such as camphor, borneol, fenchone, and the like.

The adducts can be formed by contacting of the organic compounds described above with either solid urea or solid thiourea. Usually it is desirable to employ a solvent for the amide which may also be termed an activator. Suitable activators are water and methanol, and other low-boiling oxygenated hydrocarbon derivatives may be used. For example, ethanol, acetone, methyl ethyl ketone, propanol, secondary butyl alcohol, and the like are quite suitable as activators. Also, the nitrogen-containing compounds disclosed in the copending application of Ackerman, Serial No. 155,134, filed April 10, 1950, may be employed as activators for the adduct-forming reaction. In some instances, sufficient solvent is employed to dissolve the amide, and it is preferred that the resulting solution be saturated with amide at the reaction temperature employed, but unsaturated solutions may be used. Alternatively, solid amide can be used with only sufficient solvent to wet the amide but not sufficient to form a separate, filterable, aqueous phase. The temperature at which the adduct-forming reaction is effected is dependent upon the organic compound or compounds employed. In general, the temperature is below the decomposition temperatures of the adducts to be formed and these temperatures are dependent upon the number of carbon atoms in the organic compounds reacting with the amide to form adducts. Usually the temperature is below 175° F., and in most instances room temperature or a temperature of 60 to 80° F. is employed.

Various methods of contacting the amide and the mixture to be resolved can be employed. For example, a solution of amide in an activator may be contacted either concurrently or countercurrently with the mixture to be resolved. Also, a slurry or mixture of amide and amide-activator solution may be passed either concurrently or countercurrently with the mixture to be resolved. Additionally, either a fluidized fixed bed or a moving bed of amide may be used, and the mixture to be resolved is passed into contact therewith.

In practicing my invention I ordinarily contact a solution of amide in water or other solvent, saturated at the reaction temperature, and then the resulting mixture is passed to a separating zone, for example, a filter press, and the like. In this latter zone solid adduct is separated from accompanying liquid which includes organic compounds non-reactive with the amide and a solution of unreacted amide in solvent. When a hydrocarbon mixture is being resolved and water is used as solvent, the accompanying liquid, after separation from the solid adduct, stratifies into a hydrocarbon phase and an aqueous phase which phases are readily separable from each other. The solvent phase is no longer saturated with amide, and it is desirable to reconcentrate this phase for further use in the process. Into contact with the adduct in the separation zone, such as a filter press, is then passed an organic compound non-reactive with the amide at the temperature in the separation zone and readily separable by fractional distillation, phase separation, and the like from the organic compound in the adduct. The temperature of the organic compound being passed into contact with the adduct is at least as high as the decomposition temperature of the adduct and usually within the range of 120 to 280° F. Consequently, the adduct is decomposed to regenerate solid amide and organic compound. The latter compound is then withdrawn from the filter press or other separation zone, leaving solid amide in that zone. Solid amide that remains in the separation zone is removed therefrom by passing solvent phase unsaturated with amide, discussed hereinbefore, into contact with the amide. The solvent phase is thus reconcentrated for further use in the process, and amide is thus removed from the separation zone. In this process I eliminate the need for any movement of either solid adduct or amide between zones in the process, and the process provides an efficient and economical manner for reconcentrating solvent phase.

I will describe my invention in further detail by referring to the accompanying drawing which is a schematic flow diagram of a preferred method of practicing my invention. Conventional equipment, such as pressure and temperature control devices, compressors, and the like, have not been included in the drawing, but the inclusion of such equipment is within the scope of my invention. In the process to be described hereinbelow I will employ urea in a saturated aqueous solution to remove normal paraffinic hydrocarbons from a crude oil fraction boiling within the range of 520 to 600° F.

Referring now to the accompanying drawing, a saturated solution of urea in water is maintained in surge tank or urea solution storage 1 at a temperature within the range of 60 to 80° F. Temperature control of the solution is effected either by passage of steam through coil 2 or by circulating at least a portion of the solution in tank 1 through pump 3, line 4, and cooler 5. The proper concentration of urea in tank 1 is controlled by addition of urea from storage hopper 6 by means of blower 7 which blows urea through line 8 into tank 1. Air used as a carrier for the urea is vented from tank 1 via line 9. As required, water is added to tank 1 via line 10 and internal mixer 11 is used to insure good mixing of the urea and water. Aqueous urea solution is removed from tank 1 via pump 3 and line 12 and thus passed to reactor 13. Cooler or heater 14 is placed in line 12 in order to make final temperature adjustments of the aqueous urea solution before it is introduced to reactor 13. Into reactor 13 is also introduced a hydrocarbon mixture to be resolved in my process. This mixture is withdrawn from hydrocarbon storage 15 and pumped to reactor 13 by pump 16 and through line 17. In this embodiment the hydrocarbon feed is a cetane concentrate boiling within the range of 520 to 600° F., and it also contains hydrocarbons non-reactive with urea. Reactor 13 is preferably provided with cooling coils or water jacketed in order that the temperature within the reactor can be maintained within the range of 60 to 80° F. Higher or lower temperatures may be employed, if desired, but the above temperature range is preferred. Reactor 13 is also provided with mixer 18 in order to insure good mixing of the reactants in the reaction zone. The reactants are contacted for a period of 1 to 60 minutes, and the urea reacts with the straight-chain hydrocarbons in the hydrocarbon feed to form solid addition products or adducts. These adducts precipitate out in the form of a slurry and the consistency of the slurry is controlled by the use of excess aqueous area solution entering reactor 13 via line 12.

After a sufficient reaction time, slurry of urea adduct, aqueous urea solution and unreacted hydrocarbons is transferred with pump 19 through line 20 to filter press 21 where the solid adduct is filtered out and thus separated from accompanying liquid in the reaction mixture. The thus-separated liquid is passed via line 22 to separator tank 23 where the liquid stratifies into an upper hydrocarbon phase and a lower aqueous phase. The upper hydrocarbon phase containing isoparaffinic hydrocarbons and/or cyclic hydrocarbons is removed from separator tank 23 via line 24 as a product of the process. The lower aqueous phase, which is an unsaturated solution of urea in water, is pumped from separator tank 23 by pump 25 and line 26 into dilute urea solution storage tank 27. After all the slurry from reactor 13 has been transferred or when filter 21 becomes full of solid urea adduct, valve 28 in line 20 and valve 29 in line 22 are closed and valves 30, 31, 32 and 33 are opened to allow circulation of cold wash oil. This wash oil is a hydrocarbon that is non-reactive with urea and it can be a light naphthenic hydrocarbon, an isoparaffinic hydrocarbon or a low-boiling paraffinic hydrocarbon, such as n-pentane. Throughout the remainder of this description, I will refer to this hydrocarbon as the wash oil. The wash oil is withdrawn from storage tank 34 through pump 35 and lines 36 and 37 into filter 21 and passed through line 38 into surge tank 39. Heater 40 is not used at this time to heat liquid passing therethrough. This wash oil removes from the adduct raffinate oil or hydrocarbons non-reactive with urea which is adsorbed thereon. When the adduct in filter 21 is sufficiently clean, steam or hot water is passed through heater 40 and the wash oil is thus warmed to a temperature high enough to cause the urea adduct in filter 21 to decompose or to break down into urea and n-paraffin hydrocarbons. The specific temperature to which the wash oil is heated is dependent upon the hydrocarbons in the adduct with the urea since the thermal stability of the adducts is dependent upon the number of carbon atoms in the adduct-forming hydrocarbons. In any event, the temperature is usually within the range of 120 to 280° F. Higher temperatures may be employed, but at such higher temperatures undesirable decomposition of the uera occurs. As soon as the wash oil is heated, valve 33 is closed and valve 41 is opened and the warm wash oil with n-paraffins resulting from the decomposition of the adducts is passed to tank 42 via line 68. After the adduct in filter 21 has been completely decomposed and all of the n-paraffin has been removed therefrom with the warm wash oil, only solid urea remains in filter 21. Valve 30 is closed and compressed air is blown through line 43 to remove absorbed wash oil and n-paraffins from the solid urea in filter 21. Wash oil and n-paraffins thus-removed are also passed to tank 42 via line 38, valve 41 and line 68. Subsequently, valve 41 is closed. In order to remove the dry urea from filter 21, dilute aqueous urea solution in tank 27 is pumped by pump 44 via lines 45 and 37 and valve 46 into heater 40 where the dilute urea solution is heated to increase its solvent capacity for urea. The thus-heated aqueous urea solution is then passed to filter 21 where it dissolves solid urea therein, and it is then returned from filter 21 through valve 32, line 38 and valve 47 to storage tank 27. After all the solid urea is dissolved in this manner from tank 21, the remaining aqueous urea solution therein is blown back to tank 27 with compressed air entering filter 21 via line 43, and the filter is then ready for further filtering or separating of adduct from slurry entering the filter via line 29. Urea solution in tank 27 is then pumped by pump 44 through line 49 to cooler 5 where the temperature is lowered to about that prevailing in tank 1, and the urea solution is then returned to tank 1.

Raffinate wash oil in tank 39 is then charged to fractionator 50 through pump 51 and line 52. The mixture is boiled with heater 53 and the vapors passing overhead through line 54 are condensed in cooler 55 and then passed into reflux drum or accumulator 56. The pressure on accumulator 56 is controlled with vacuum jet 57 so that fractionator 50 can be operated at a pressure and temperature sufficiently low to avoid decomposition of the bottoms product therefrom. The bottoms product from fractionator 50 is similar to raffinate product withdrawn from the process via line 24, and this bottoms product can be removed from fractionator 50 via pump 58 and line 59. If desired, it may then be admixed with the raffinate product passing via line 24. The overhead product from fractionator 50 is similar to the wash oil, and it is pumped by pump 60 via line 61 as reflux and lines 62 and 63 to clean wash oil storage 34. After fractionator 50 has been drained and flushed with a clean naphtha, extract wash oil in tank 42 is charged to fractionator 50 via line 66 and pump 67 and the light wash oil is distilled overhead, as already described, and the heavy n-paraffins are yielded as bottoms product. The latter is then withdrawn via pump 58 and line 59 to n-paraffin storage.

For the special case of recovering a pure n-paraffin, such as cetane, the n-paraffins are permitted to accumulate in the bottom of fractionator 50 and after all the light wash oil has been removed overhead, the temperature of reboiler 53 is raised or the pressure of accumulator 56 is lowered, and the n-paraffins are distilled off overhead one at a time to storage via lines 62 and 64. Fractions boiling between the pure paraffin products are withdrawn via lines 62 and 65 with the fractionator being refluxed in the normal manner through line 61.

It is also within the scope of my invention to employ two or more filter presses in place of filter 21. Then, while adduct is being decomposed in and urea is being removed from one filter press, the slurry stream passing via line 20 is passed to a second filter press to remove adduct from the slurry. It is also within the scope of my invention to employ two or more reaction zones in place of reactor 13. From the above discussion numerous modifications and advantages of my process will be apparent to those skilled in the art.

I claim:

1. A process for the resolution of a mixture of organic compounds only a portion of which reacts with an amide selected from the group consisting of urea and thiourea to form solid adducts therewith, which comprises, contacting said mixture with a concentrated solution of said amide under adduct-forming conditions comprising a reaction temperature in the range 60 to 80° F. and a time of 1 to 60 minutes so as to form a mixture comprising a solid adduct phase, a residual phase of unreacted organic compounds, and a depleted amide solution phase; maintaining the consistency of the mixture within the reactor as a slurry by addition thereto of excess amide solution; passing said slurry to a first separating zone and retaining solid adduct particles therein; passing the liquid effluent from said first separating zone to a second separating zone and separating unreacted organic compounds from depleted amide solution; washing solid adduct particles in said first separating zone free from occluded impurities by contacting same with a washing medium nonreactive with said selected amide and a nonsolvent therefor at a temperature below the decomposition temperature of said adduct; decomposing the purified adduct in said first separating zone by contacting same with a quantity of said washing medium at an elevated temperature above the decomposition temperature of said adduct; recovering from said decomposition step regenerated adduct-forming compound in admixture with washing medium while retaining solid regenerated amide within said first separating zone; recovering regenerated adduct-forming compound from said admixture; heating depleted amide solution to a temperature above the reaction temperature; removing solid amide from said first separating zone by contacting same with heated depleted amide solution from said second separating zone at said elevated temperature so as to dissolve all said solid amide; and recycling said reconcentrated amide solution to said first contacting step.

2. A process according to claim 1 wherein the amide employed is urea.

3. A process according to claim 1 wherein the amide employed is thiourea.

4. A process according to claim 1 wherein n-pentane is employed as washing and decomposition medium.

References Cited in the file of this patent

UNITED STATES PATENTS

| | | |
|---|---|---|
| 2,318,988 | Craig | May 11, 1943 |
| 2,499,820 | Fetterly | Mar. 7, 1950 |
| 2,549,372 | Fetterly | Apr. 17, 1951 |
| 2,557,257 | Melrose | June 19, 1951 |
| 2,577,202 | Lien et al. | Dec. 4, 1951 |
| 2,588,602 | Adams et al. | Mar. 11, 1952 |
| 2,627,513 | Arey | Feb. 3, 1953 |
| 2,642,377 | Fetterly | June 16, 1953 |

OTHER REFERENCES

Australian application 17339/47 available February 12, 1948.